United States Patent
Whittenberger et al.

(10) Patent No.: US 9,403,138 B2
(45) Date of Patent: Aug. 2, 2016

(54) WIRE STANDOFFS FOR STACKABLE STRUCTURAL REACTORS

(71) Applicant: Johnson Matthey Public Limited Company, London (GB)

(72) Inventors: William A. Whittenberger, Leavittsburg, OH (US); Joseph W. Whittenberger, Ravenna, OH (US); Brian L. Davis, Ravenna, OH (US)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 637 days.

(21) Appl. No.: 13/853,364

(22) Filed: Mar. 29, 2013

(65) Prior Publication Data
US 2013/0259767 A1 Oct. 3, 2013
US 2015/0314257 A9 Nov. 5, 2015

Related U.S. Application Data

(60) Provisional application No. 61/619,001, filed on Apr. 2, 2012.

(51) Int. Cl.
*B01J 8/04* (2006.01)
*B01J 8/06* (2006.01)
(Continued)

(52) U.S. Cl.
CPC *B01J 8/008* (2013.01); *B01J 8/025* (2013.01); *B01J 19/249* (2013.01); *B01J 19/2485* (2013.01); *B01J 19/305* (2013.01); *B01J 19/325* (2013.01); *G01V 1/003* (2013.01); *G01V 1/3808* (2013.01); *B01J 2208/00884* (2013.01);
(Continued)

(58) Field of Classification Search
CPC ............ B01J 2219/32275; B01J 2219/32466; B01J 2219/32231; B01J 2219/32272; B01J 2219/2459; B01J 2219/2455; B01J 2219/2443; B01J 2219/2493; B01J 2219/2496; B01J 19/325
See application file for complete search history.

(56) References Cited

U.S. PATENT DOCUMENTS 4,121,909 A * 10/1978 Cronauer ................. B01J 23/85
422/222
4,397,817 A * 8/1983 Otani .................... F01N 3/2867
422/179

(Continued)

FOREIGN PATENT DOCUMENTS

EP 1857174 11/2007
RU 2423657 7/2011

OTHER PUBLICATIONS

The International Search Report and Written Opinion issued in International Patent Application No. PCT/US2013/34570, dated Aug. 22, 2013.

*Primary Examiner* — Jennifer A Leung
(74) *Attorney, Agent, or Firm* — Pearne & Gordon LLP (57) ABSTRACT

A wire standoff suitable for use in a tubular reactor, such as a reformer, is described. The wire standoff includes a portion or segment positioned between an outer reactor tube and one or more reactor components located within the tube. The reactor components and the outer tube are prevented from coming into directed contact with one another by the positioning of the wire standoff. The wire standoff can be secured to a reactor component at one of its ends or to a washer located between stacked reactor components. Prevention of the reactor components from contact with the outer tube promotes fluid flow through the reactor and can enhance heat transfer and reactor efficiency for carrying out catalytic reactions.

12 Claims, 10 Drawing Sheets

(51) Int. Cl.
  B01J 19/24   (2006.01)
  B01J 19/32   (2006.01)
  B01J 8/00    (2006.01)
  G01V 1/00    (2006.01)
  B01J 19/30   (2006.01)
  B01J 8/02    (2006.01)
  G01V 1/38    (2006.01)
  *F28F 3/08*      (2006.01)
  *F28F 9/007*     (2006.01)
  *F28F 13/06*     (2006.01)
  *F28D 21/00*     (2006.01)

(52) U.S. Cl.
  CPC ......... *B01J2208/06* (2013.01); *B01J 2219/249* (2013.01); *B01J 2219/2443* (2013.01); *B01J 2219/2455* (2013.01); *B01J 2219/2459* (2013.01); *B01J 2219/2482* (2013.01); *B01J 2219/2485* (2013.01); *B01J 2219/2486* (2013.01); *B01J 2219/2487* (2013.01); *B01J 2219/2488* (2013.01); *B01J 2219/2496* (2013.01); *B01J 2219/3085* (2013.01); *B01J 2219/30475* (2013.01); *B01J 2219/3221* (2013.01); *B01J 2219/32275* (2013.01); *B01J 2219/32466* (2013.01); *F28D 2021/0022* (2013.01); *F28F 3/083* (2013.01); *F28F 9/0075* (2013.01); *F28F 13/06* (2013.01)

(56) References Cited

U.S. PATENT DOCUMENTS

| | | | |
|---|---|---|---|
| 7,428,896 B2 * | 9/2008 | Eriksson | F02M 27/02 123/538 |
| 7,501,102 B2 | 3/2009 | Whittenberger et al. | |
| 7,682,580 B2 | 3/2010 | Whittenberger et al. | |
| 7,906,079 B2 | 3/2011 | Whittenberger et al. | |
| 2010/0040190 A1 | 2/2010 | Tentarelli | |
| 2012/0195801 A1 | 8/2012 | Whittenberger et al. | |

* cited by examiner

WIRE STANDOFFS FOR STACKABLE STRUCTURAL REACTORS

This application claims the benefit of U.S. Provisional Application No. 61/619,007, filed Apr. 2, 2012, which is incorporated herein by reference in its entirety.

FILED OF THE INVENTION

The present invention relates to improved stackable structural reactors having increased efficiency and productivity, and in particular, improved stackable structural reactors having one or more wire standoff arrangements for increased heat transfer and reactor efficiency.

BACKGROUND

Reactor components for carrying out catalytic reactions, such as those used to produce syngas and hydrogen, can generally contact reactor tubes exposed to a heat source, for example a furnace, to support reactions. In contrast, other types of reactions, such as exothermic reactions, can require a cooling source, such as a cooling jacket. The reactor tubes can be loaded with various arrangements of components, such as foil-supported or structured catalysts in the form of fans, fins, foams, coils or monoliths. In some instances, the reactor components can be expandable, such as those formed from foil, for example, a fan.

To improve heat transfer and fluid flow through a reactor, the fit of foil-supported catalysts can be enhanced. In a reactor tube, expandable catalyst-coated reactor components can be positioned to increase heat transfer, such as being located near the reactor wall exposed to a heating or cooling source. Thus, it is desirable to fit reactors with accessories to promote increased heat transfer and reactor efficiency, such as features that create turbulent fluid flow through the reactor components. Various embodiments of wire standoffs and arrangements of the same for improving performance of reactors are discussed herein.

BRIEF SUMMARY

A reactor including an outer tube that houses one or more reactor components and a wire standoff. The one or more reactor components can have a circular diameter and have an outer circumferential face, such that the outer diameter surface of the one or more reactor components is not in direct contact with the outer tube. The wire standoff can include a portion thereof that is positioned between the inner wall surface of the outer tube and the outer diameter surface of the one or more reactor components. As arranged, the wire standoff prevents the one or more reactor components from touching the inner wall surface of the outer tube but the wire itself can be in direct contact with the tube wall and the one or more reactor components. The wire standoff can be secured to the one or more reactor components or one or more washers also located in the outer tube.

A wire standoff for use in a reactor. The wire standoff can be a metal wire. The metal wire can have a portion positioned between an outer tube and a reactor component of the reactor, wherein the reactor component is located within the outer tube. As arranged in the reactor, the portion of the metal wire separating the outer tube and reactor component from touching can itself be in direct contact with the outer tube and the reactor component. The metal wire can have a first end portion and a second end portion defining its terminal ends. The first end portion of the metal wire can be secured to a reactor component or washer contained in the reactor. Similarly, the second end portion can be secured to a reactor component or washer of the reactor. For purposes of securing either end portion of the metal wire to a washer, the metal wire can have a hook. The metal wire can have an end portion having a straight segment for securing the wire to a reactor component, such as a fan, wherein the end portion extends inward into a reactor component and past its outer circumferential face.

BRIEF DESCRIPTION OF THE DRAWINGS

The following figures illustrate various aspects of one or more embodiments of the present invention, but are not intended to limit the present invention to the embodiments shown.

DETAILED DESCRIPTION

As used herein, when a range such as 5-25 is given, this means at least or more than 5 and, separately and independently less than or not more than 25. Materials of construction for all reactor components or parts thereof, such as catalyst supports, fans, monoliths, coils, washers and inner and outer tubes, as discussed herein, can include any suitable material as known in the art, for example, metal, non-ferrous metal, metal foil, steel, stainless steel, alloys, foils, non-metals such as plastics or glass, ceramic, or combinations thereof The reactors as described herein, sometimes referred to as a stackable structural reactors ("SSR"), can include multiple catalyst support components arranged around or stacked on a center support, such as a central rod or mandrel, pipe, post or the like, in order to form a monolith of general annular cross section as viewed in the direction of flow of fluid through the reactor. The monolith or stacked catalyst supports can occupy all or a portion of the annular space between two concentrically arranged tubes, such as a reactor or outer tube and an inner tube. Alternatively, reactor components can fill a reactor tube with or without a center support such that no center hollow section is formed concentric tubes. As described herein, various modifications and embodiments of the reactors and associated reactor components can be used in connection with wire standoffs to promote heat transfer and reactor efficiency.

The outer tube 3 having an inner wall face and an outer wall face, such as a reformer tube, can house one or more reactor components 2, such as vertically stacked fans 2, arranged on a central rod 1. The diameter of the outer tube 3 is preferably constant along its entire length. Reactor components 2, such as fans, can be constructed to have a central opening or aperture 12 for receiving the central rod 1 such that the components can slide on the central rod and be positioned in the outer tube. For example, a cylindrical rod 1 can be used as shown to support the reactor components 2 having centered circular openings 12. The cylindrical rod 1 can have a diameter about the same or slightly less than the diameter of the openings 12 in the reactor components. The central rod 1 can have a length to accommodate the length of the outer tube 3.

The central rod 1 can further include a bracket, bushing, base plate and the like for providing a stop fitting so the components do not slide off of the central rod. The base plate can be located at or near the bottom end of the central rod and can have a shape and diameter or dimensions to permit ease of install in the outer tube. For instance, the stop plate can have a circular shape with a diameter about the same or less than the inner diameter of the outer tube. The central rod can be preloaded with any number of reactor components or washers before being inserted into an outer tube.

As shown in the figures, the fans 2 can be stacked vertically, one on top of another, to form layers of reactor components 2. Although reactor components are shown vertically stacked herein, the components can be arranged in alternative ways such as horizontal to accommodate orientation of a reactor or certain technology requirements. Washers 4 as described below can be inserted between one or more reactor components (e.g., fans) 2 as desired, for example, each fan can be separated by a washer wherein the washer creates an open space between the components. Washers 4, in the shape of rings, can function as spacers and the reactor components and washers can be arranged in an alternating series. Stacked reactor components can be arranged vertically as desired, for example, in the range of 0.5 to 4 feet, to create a subassembly. Multiple subassemblies can be stacked together in a reactor, for example from 1 to 60 subassemblies can be stacked. The stacked subassemblies can have a height in the range of 2 to 60 feet.

Fluid 10, such as gas or liquid, to be reacted generally flows vertically, either up flow or down flow 10a, 10b as desired, through the outer tube 3 and through each component 2 arranged on the central rod 1. Reactor components 2 direct fluid flow in other non-vertical directions to increase heat transfer, for example fans direct or guide fluid flow radially (perpendicular to the overall vertical direction) towards the outer tube wall. The fans can be in contact with or near the inner wall surface of the outer tube 3, which effectively transfers heat from the exterior of the reactor to the reactor components 2 and fluid 10 contained therein. Preferably, the fans located within the outer tube have a diameter less than the inner diameter of the reactor tube to create a gap or free space 7 between the outer circumferential face of the fans and the inner wall surface of the outer tube. The gap 7 between the outer diameter face of the fans and the inner wall surface of the outer tube can be at least 0.5, 1, 2, 3, 5, 10 or 15, mm and preferably in the range of 0.5 to 6, and more preferably 1 to 3 mm. The gap 7 promotes heat transfer and forces fluid flow traveling toward the inner wall surface of the reactor wall to be directed back towards the inner portion of the reactor.

The stacked arrangement of reactor components 2 is designed to promote heat transfer for carrying out catalytic reactions such that reactor components 2 and washers 4 can be coated with a catalyst to effectively distribute catalyst contact with most of the volume of fluid 10 flowing through the reactor. Catalytic material for coating reactor components is known in the art and can include, but is not limited to, nickel, palladium, platinum, zirconium, rhodium, ruthenium, iridium, cobalt and oxides of aluminum, cerium, and zirconium.

Figure 1:
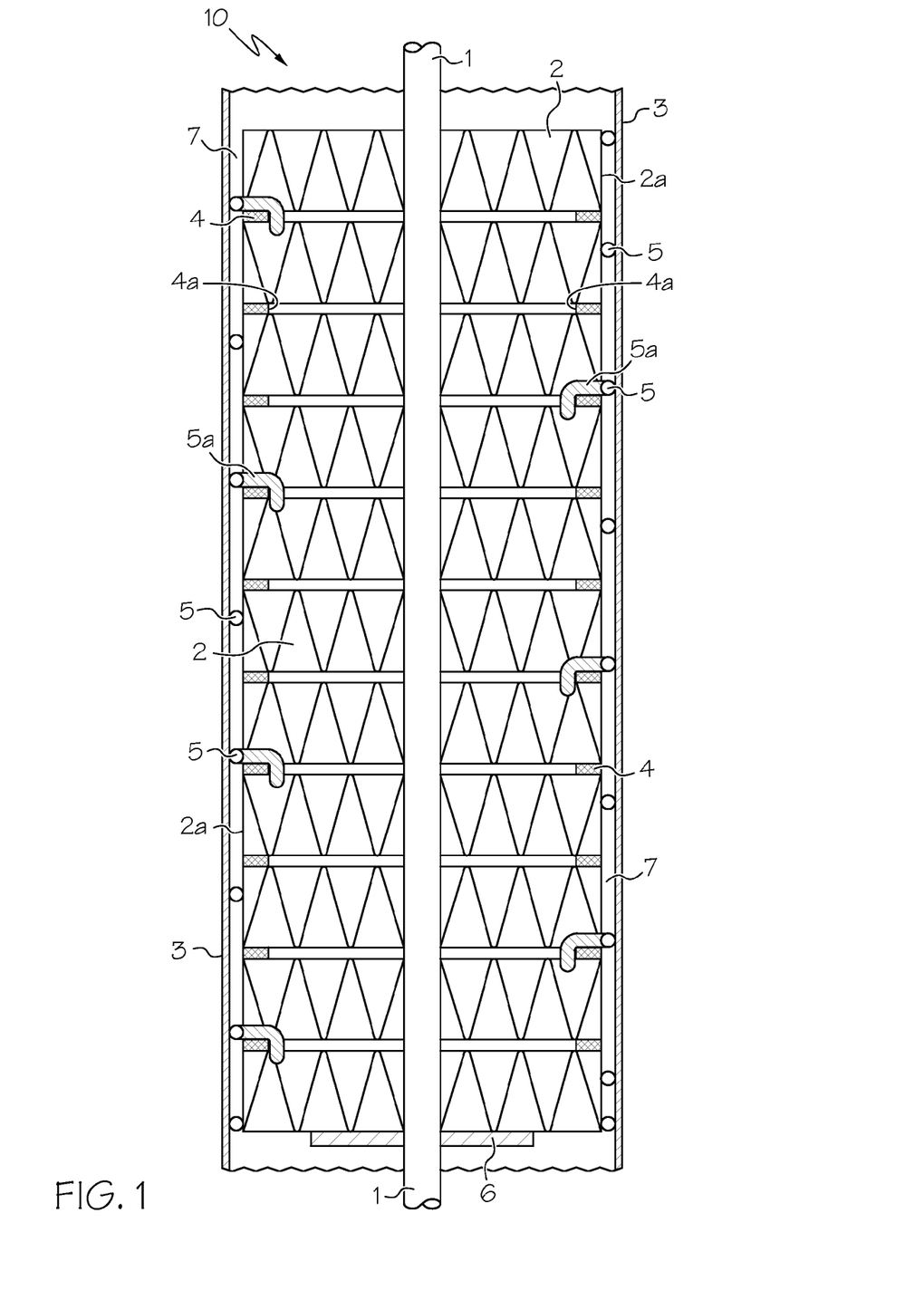
FIG. 1 shows a cross-section view of a reactor tube having multiple wire standoffs arranged along the outer diameter face of reactor components and between the outer tube and the components.

As discussed below, wire standoffs 5 can have various designs and configurations and can be positioned and arranged in many ways with the reactor components 2 and washers 4. Turning to the figures, FIG. 1 shows a reactor having wire standoffs 5 arranged inside an outer tube 3 for preventing the reactor components and washers from contacting the inner wall surface of the outer tube. As shown, the reactor components 2 are arranged vertically in a stacked manner with alternating washers within the outer tube 3. The reactor components are arranged on a central rod 1 that traverses the length of the outer tube. To prevent the stacked reactor components and washers from sliding downward and off of the central rod, a stop plate 6 is positioned at or near the bottom end of the central rod 1. Fluid 10 can flow through the reactor components 2 and downward/upward through the outer tube 1. Fluid 10 contacts catalyst supports for carrying out reactions in the outer tube.

Secured to the washers 4 or reactor components 2, wire standoffs 5 are positioned around the outer diameter surface of the components 2 or washers 4. The wire standoffs 5 can be made of any suitable material, such as metal, steel, stainless steel, alloys, such as nickel and/or chromium, foil, and non-metal materials such as plastic. For example, the wire standoff can be a metal wire, cable, cord or filament. Preferably, the wire standoffs 5 are flexible such that suitable structural modifications can be made to alter the wire standoff to a particular reactor component or components. The wire standoffs 5 can be preferably made from circular diameter flexible wire that can have a constant diameter along the entire length of the wire. The wire standoff can have a circular diameter of at least 0.25, 0.5, 0.75, 1, 1.5, 2, 2.5, 3, 3.5, 4, 4.5, 5, 6, 7, 8, 9 or 10 mm, and preferably in the range of 0.25 to 5 mm, and more preferably 0.5 to 2 mm. Optionally, square or alternate cross section shapes can be used for making the wire standoffs as desired.

The wire standoffs 5 can be designed to extend lengthwise, such as vertically, along the outer diameter face 2a of one or more reactor components 2 as shown in the figures. In some instances, the wire standoffs 5 can traverse vertically across at least one reactor component or in other cases across substantially the entire reactor sleeve of stacked components. Traversing the across the outer diameter surface 2a of one or more reactor components 2, the wire standoffs 5 prevent the one or more reactor components, and any washers 4 in the stack, from directly contacting the outer tube 3. As shown in the cross-section view, multiple wire standoffs 5 can be arranged to ensure a substantially constant annular gap 7 between the outer diameter face of the reactor components and washers and the inner wall surface of the outer tube. Any number of wire standoffs can be used to ensure the annular gap, for example, 1, 2, 3, 4, 5, 6, 7, 8, 9 or 10 wire standoffs can be used. The gap 7 between the outer diameter face of the reactor components and washers and the inner wall surface of the outer tube 3 created by the wired standoffs can be at least 0.25, 0.5, 1, 2, 3, 4, 5 or 10, mm and preferably in the range of 0.5 to 6, and more preferably 1 to 3 mm.

The wire standoffs 5 can have inward-facing end portions 5a at each end (first and second) such that the inward-facing end portions bend or extend into a reactor component 2 or around a washer 4 as shown, which can prevent the end portions 5a of the wire standoff 5 from catching against the reactor tube 3 during installation or operation. The wire standoff has two ends, a first end or end portion and a second end or end portion. FIG. 1 shows an end portion 5a of the wire standoff having a hook for securing the end potion 5a to the washer 4. The hook of the end portion 5a of the wire standoff can have a bend angle in the range of 70 to 180 degrees. As shown, an end portion of a wire standoff can extend inward through the outer diameter surface plane 2a of a reactor component 2, such as a fan, over the top surface of a washer 4 and bend downward at about a 90-degree angle around the inner diameter face 4a of the washer 4 to secure the wire standoff 5. In this arrangement, the end portion 5a of the wire standoff has a 90-degree hook for securing the wire standoff to the washer.

Separate from the end portions 5a, the wire standoff 5 has another portion, such as a middle section or portion, positioned between the outer diameter surface of the reactor components 2a and the inner wall surface of the outer tube 3. The wire standoffs 5 can be spaced radially around the diameter of a washer 4 as desired and along other washers located above and/or below as shown to provide perimeter coverage to the reactor components.

Figure 2:
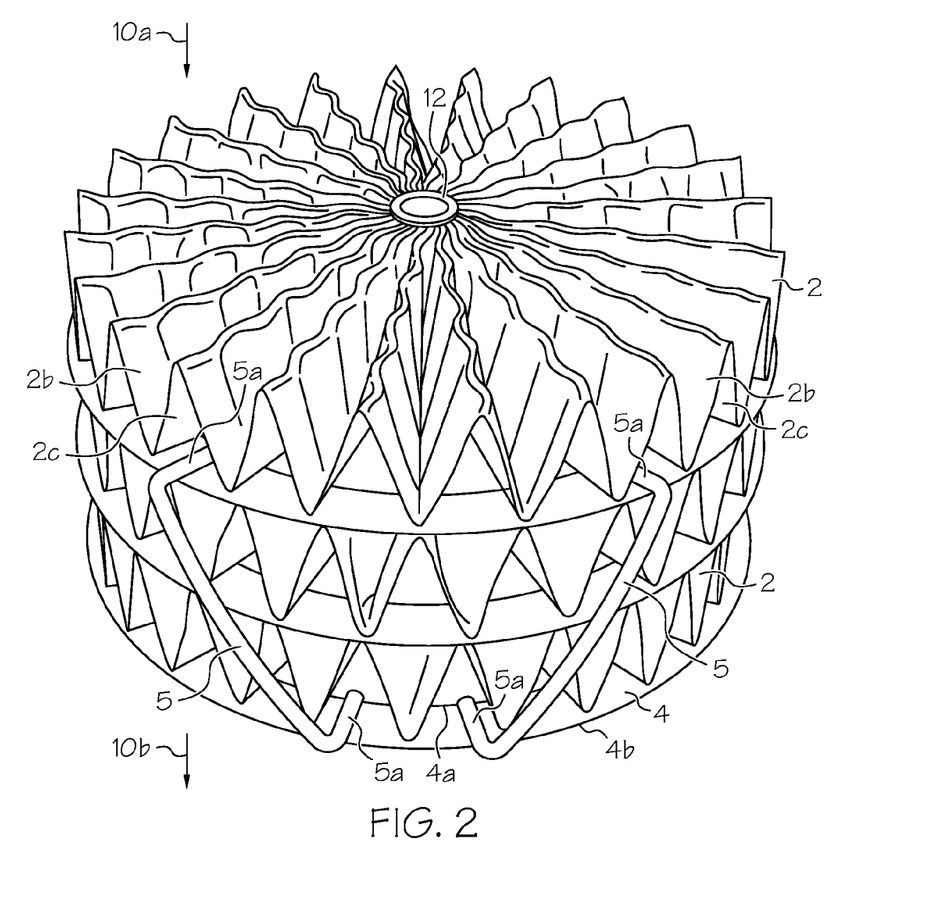
FIG. 2 shows a perspective view of a stack of reactor components having multiple wire standoffs arranged along the outer diameter face of the reactor components wherein the wire standoffs traverse the face of multiple components.

FIG. 2 shows two wire standoffs 5 positioned diagonally across the outer diameter surface of three stacked reactor components 2. Each reactor component has an opening 12 for accommodating a central rod for positioning the components in a stacked arrangement in an outer tube. Washers 4 in the shape of rings having an outer diameter 4b, a flat body section and an inner diameter 4a are positioned between each reactor component 2. The first and second end portions 5a of the two wire standoffs 5 are secured to the top most washer and the bottom most washer. The first and second end portions of the wire standoffs extend inward towards the center of the reactor components and traverse across the top of the flat body section of each washer 4. As can be seen at the bottom most washer, the end portions 5a of the wire standoffs are bent near the inner diameter 4a of the washers such that the end portions extend downward to hook around the inner diameter 4a of the washers. As noted above, the wire standoffs 5 can have a hook portion for securing the wires to the washers, wherein the hook portion can have a bend in the 70 to 180 degree range.

As arranged in an outer tube, the fans 2 have multiple radial fluid ducts 2b, 2c for directing fluid flow 10 through the reactor. As shown, the radial fluid ducts are of approximately triangular shape and extend outward from the center opening 12 to form a circular cross section as viewed from the top of the fans 2. The radial fluid ducts terminate along the outer diameter face of each fan to form triangular openings facing the inner wall surface of an outer tube. As viewed in the downward direction of fluid flow, fluid flows in one end 10a of the stack of fans 2, radially through the triangular-shaped ducts openly facing upward 2b towards the outer diameter face of the fans 2 for contacting the reactor tube, around the outer diameter face of the fans 2 into the triangular-shaped ducts openly facing downward 2c, radially towards the center of the fans 2 and onto the next fan and/or core in the same manner until the fluid exits the stack of fans at the other end 10b. In one arrangement, for example as shown in FIG. 2, the fans 2 can be stacked in an arrangement that vertically aligns the approximately triangular-shaped ducts openly facing upward 2b of one fan with the approximately triangular-shaped ducts openly facing downward 2c of the fan 2 positioned directly above or below.

In between the two end portions 5a of each wire standoff 5 is a portion positioned between the outer tube and the outer face of the reactor components 2 to prevent the components from coming into contact with the outer tube (not shown). The middle portion for ensuring a gap between the outer tube and reactor components can traverse diagonally as shown along the outer diameter face of the fans, or in another direction or pattern as desired, for example, vertical or in a curved pattern, such as a "C" shape, spiral, wave or zig zag pattern. Diagonal positioning of the middle section of the wire standoffs 5 can be on an angle in the range of 5 to 70 degrees. Multiple wire standoffs can be arranged around the outer diameter surface of the stacked fans 2 to provide 360 degree coverage of the stacked components for ensuring a specified gap is maintained around the components and between the inner wall of the outer tube. Although three components are shown, the stack can include more components and the wire standoffs can have a length to accommodate any number of components.

The end 5a and middle portions of the wire standoffs 5 can be secured to a washer 4 or a reactor component 2 in a number of different ways. Wire standoffs as described herein can have one or more securing features. For instance, each end portion 5a of a wire standoff can have a different securing feature, such as a hook, and the middle portion of that standoff can further include yet another embodiment of a securing feature. The selection and variety of securing features for a wire standoff can be chosen as desired. The securing features of the wire standoffs are preferably integral to the construction of the standoffs. For example, a metal wire can be bent and manipulated to form a hook or notch at either end or the middle portion for securing the wire standoff to a washer or reactor component.

Figure 3:
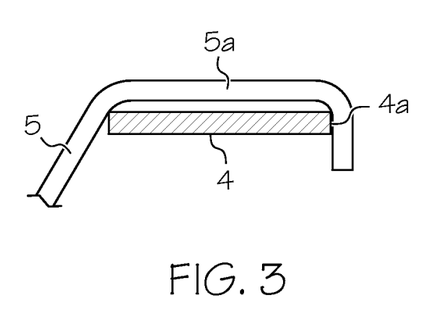
FIG. 3 shows a cross-section view of a wire standoff arranged on a washer for purposes of securing the wire standoff on the washer.

FIG. 3 shows one embodiment for securing an end portion 5a of a wire standoff 5 to a washer 4. As shown, a cross-section view of a washer 4 has an end portion 5a of a wire standoff 5 extended along its width over the top of its body section. At the inner diameter 4a of the washer 4, the end portion 5a of the wire standoff has a bend at about a 90-degree angle such that the bent end forms a hook that fits on the inner diameter 4a of the washer. The hook prevents the wire standoff 5 from sliding or being pulled off the washer 4 during installation or operation of the reactor. The hook can be secured on the washer by tension. For example, the wire standoff can be flexed or pushed on the washer to force the hook around the inner diameter 4a of the washer 4. The end portion 5a of the wire standoff 5 can be welded, such as tack weld or laser weld, on the washer 4 to permanently secure the wire standoff to the washer.

Figure 4:
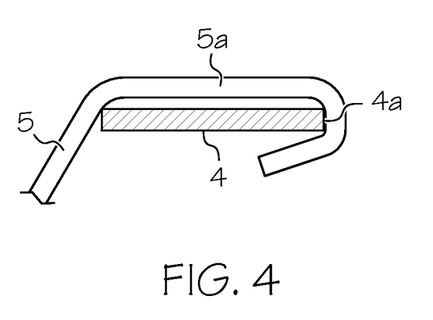
FIG. 4 shows a cross-section view of a wire standoff arranged on a washer for purposes of securing the wire standoff on the washer.

FIG. 4 shows another embodiment for securing a wire standoff 5 to a washer 4. The end portion 5a of the wire standoff 5 can have a hook portion that forms approximately a 180-degree bend for hooking the end portion around the inner diameter 4a of a washer. As shown, the inner diameter of the washer is in direct contact with the inside surface of the hook of the end portion. The bend angle of the hook can be less than 180 degrees, for example, at least 120, 130, 140, 150, 160 or 170 degrees.

The wire standoffs 5 can be secured to washers 4 positioned in the outer tube by means of end portions 5a of the wire standoffs being inserted into openings or apertures 14 located in the washers 4, for example, in the body section. The washers 4 can have one or more openings 14 for accommodating the end portion 5a of a wire standoff. For example, a washer 4 can have 1, 2, 3, 4, 5, 6 or more openings 14 for securing wire standoffs. The openings can be spaced along the body section of the washer as desired and can be selected to accommodate wire standoffs for providing coverage across the entire face of stacked reactor components. The opening 14 can be any shape and have dimensions greater than the diameter or cross-section area of the end portion of the wire standoff. For example, the washer openings 14 can be circular and have a circular diameter of at least 1, 2, 3, 4, 5, 6, 7, 8, 9, 10, 15, 20 or 25 mm.

Figure 5:
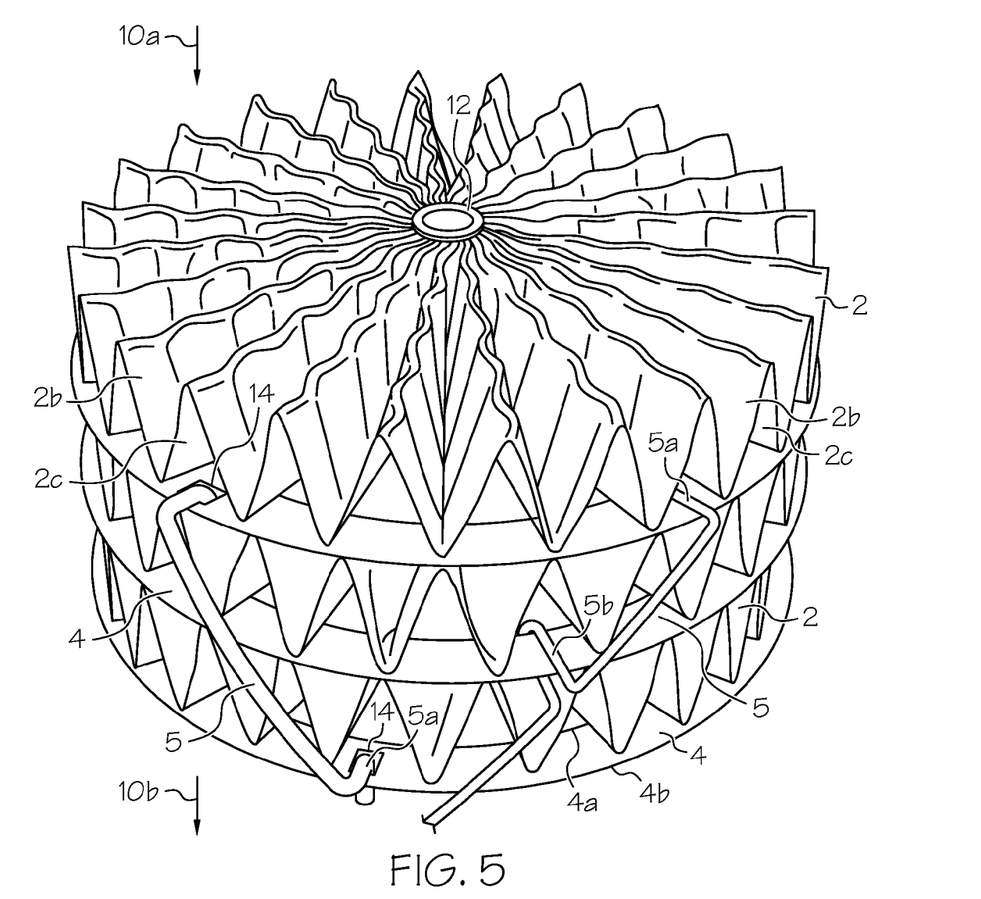
FIG. 5 shows a perspective view of a stack of reactor components having multiple wire standoffs arranged along the outer diameter face of the reactor components.
Figure 7:
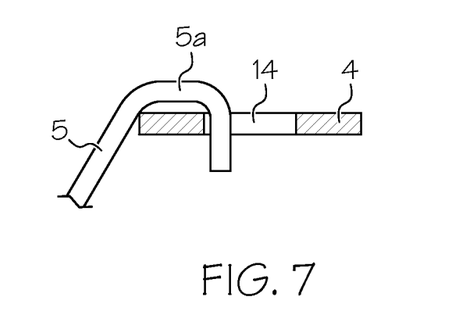
FIG. 7 shows a cross-section view of a wire standoff arranged through an opening in a washer for purposes of securing the wire standoff on the washer.

FIG. 5 shows a wire standoff 5 diagonally positioned across the outer diameter face of two vertically-stacked fans 2 wherein the wire standoff has two end portions 5a, a first and second, that extend through openings 14 in the washers 4. The end portions 5a can form a hook by having a bend in the range of 70 to 180 degrees. The hook can be forced through the opening 14 in the washer to secure the wire standoff. FIG. 7 shows an end portion 5a of a wire standoff 5 extending downward through an opening 14 in a washer 4. The end portion has a hook having a bend angle of about 90 degrees.

Figure 6:
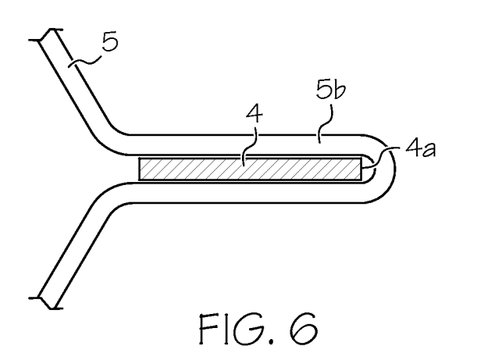
FIG. 6 shows a cross-section view of a wire standoff arranged on a washer for purposes of securing the wire standoff on the washer.

In another embodiment of securing a wire standoff to a washer, FIG. 5 shows a wire standoff with a middle portion having a hook or notch 5b that forms an open slot. The hook or notch 5b can be an indented portion along the length of the wire standoff 5, for example in the portion that is positioned between the outer tube and reactor components. One or more notches 5b can be positioned anywhere along the length of the wire standoff to align with the desired reactor components 2. For instance, a washer 4 can be positioned or nested in the open slot of the hook 5b for securing the wire standoff to the washer. The wire standoff can be flexed or forced around the inner diameter 4a of a washer to slide the open slot of the middle portion over the washer for securing the wire standoff. The remaining two end portions 5a of the wire standoff can include securing features as discussed herein, such as a hook having a bend angle in the range of 70 to 180 degrees. FIG. 6 shows a cross-section view of a washer 4 positioned in the open slot of a middle portion of a wire standoff having a notch 5b. As shown, the inner diameter face 4a of the washer is in direct contact with the open slot formed by the notch 5b in the wire standoff. It may be desirable to have one or more open slot hooks 5b between the two end portions 5a of a wire standoff for securing the standoff to vertical arrangement of washers 4. Multiple open slots can provide structural integrity and rigidity to the portions of the wire standoff positioned between the outer tube and the outer diameter face of the reactor components.

Figure 8:
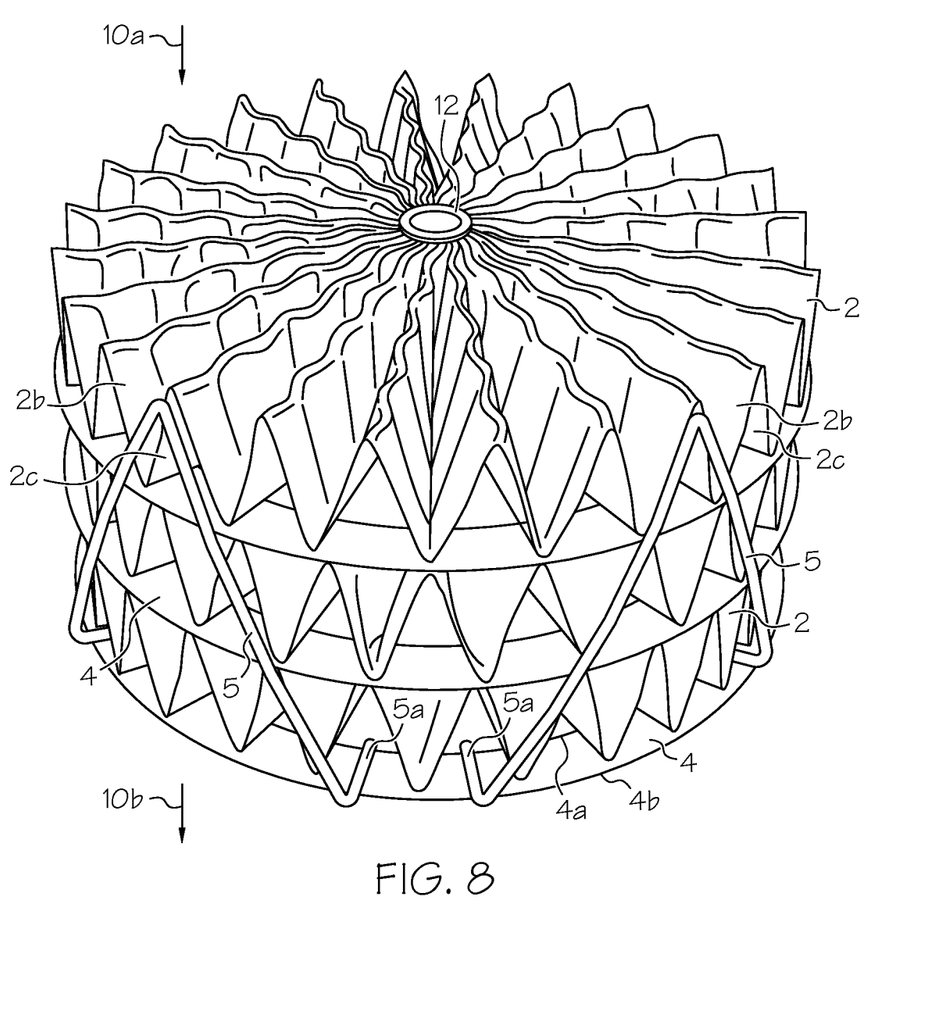
FIG. 8 shows a perspective view of a stack of reactor components having multiple wire standoffs arranged along the outer diameter face of the reactor components.

FIG. 8 shows another embodiment of a wire standoff 5. A wire standoff can be designed to have a middle portion having a V-shape. The angle of the V-shape can be in the range of 30 to 90 degree. The V-shape of the middle portion can be arranged upward as shown or downward for traversing across the outer diameter face of one or more stacked reactor components. Alternatively, multiple V-shaped wire standoffs can be arranged around the outer diameter face of reactor components in an upward/downward alternating pattern to provide 360-degree coverage of the outer diameter face of the components for ensuring the reactor components do not come into contact with the outer tube. Any number of wire standoffs can be used to encompass the outer diameter face of one or more reactor components. The V-shape portion can cover at least 1, 2, 3, 4 or more reactor components, such as fans.

Figure 9:
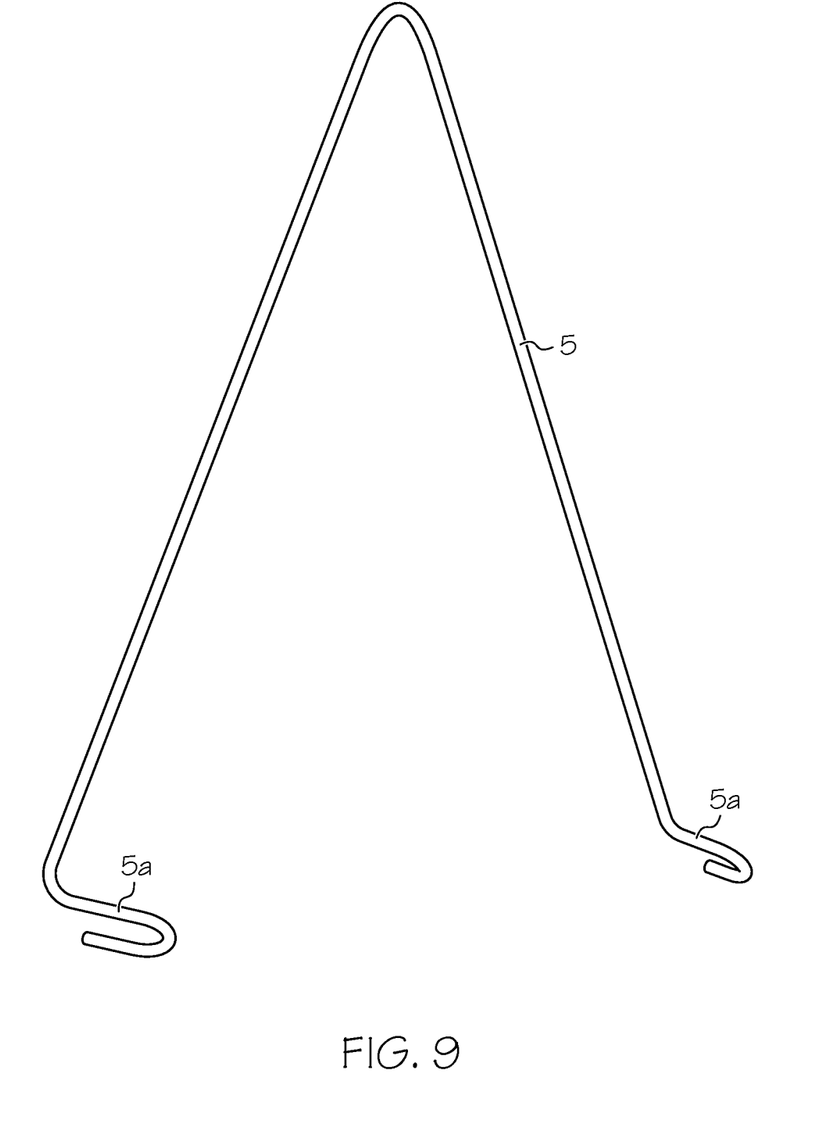
FIG. 9 shows a perspective view of a wire standoff having hook ends for securing the wire standoff to a reactor component or washer.

As shown in FIG. 9, the two end portions 5a of the V-shaped wire standoff 5 can have a hook for securing the standoff to a washer. The hook can have a bend angle in the range of 70 to 180 degrees. The hook can form a notch for nesting a washer or alternatively the end portion can have a hook for extending through an opening in a washer.

Figure 10:
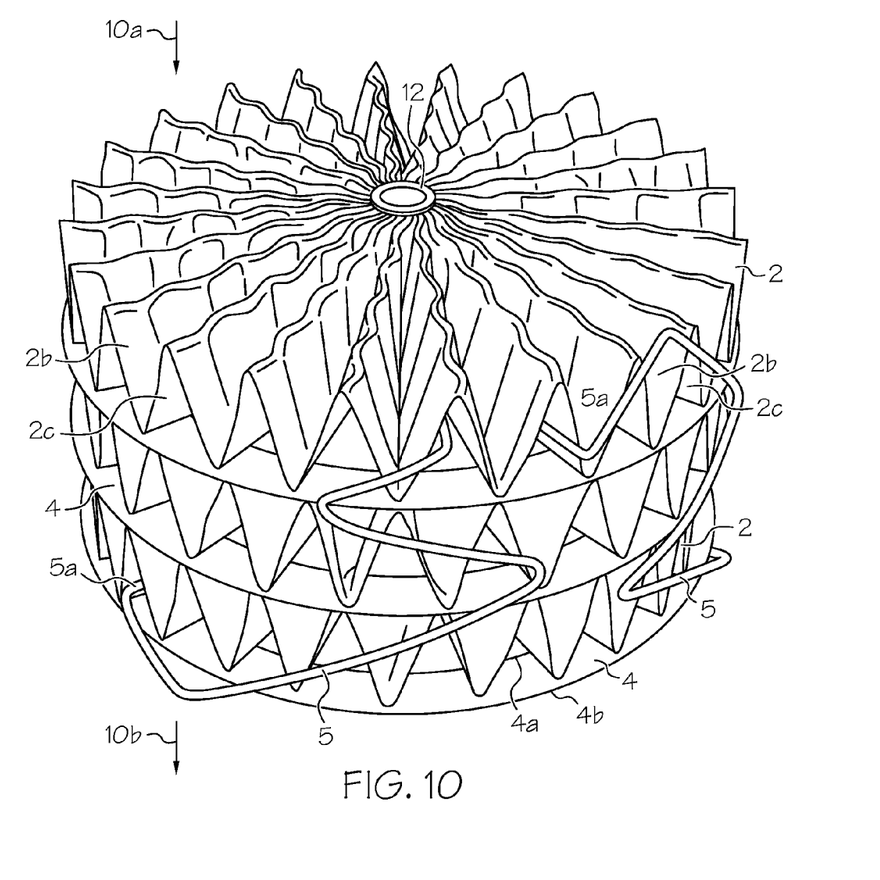
FIG. 10 shows a perspective view of a stack of reactor components having multiple wire standoffs arranged along the outer diameter face of the reactor components.

In another embodiment, a wire standoff can be secured to a reactor component. An end portion 5a of a wire standoff can be a straight section without a hook. The straight end portion can extend inward into the at least one reactor component 2 through the outer circumferential face, for example into a fluid channel or duct 2b, 2c. For instance, as shown in FIG. 10, the straight section or segment of the end portion 5a can extend into the flow channel 2b, 2c of a fan reactor component 2. The end portion can be secured to the reactor component by welding or tension caused by flexing the wire standoff 5 to fit the end portion in the flow channel 2b, 2c. The opposing end portion of the wire standoff can be similarly secured to a reactor component or, alternatively, it can be secured to a washer as described above.

FIG. 10 shows that the middle portion of a wire standoff, between the two end portions 5a secured to reactor components, can have a series of zig zags in an alternating "Z" pattern. Multiple wire standoffs having a zig zag pattern can be used to encompass the outer diameter face of one or more reactor components 2. As arranged on the outer diameter face of reactor components, the wire standoff can have a height of at least 3, 4, 5, 6, 7, 8, 9, 10 or more reactor components or 4 to 30 inches.

Figure 11:
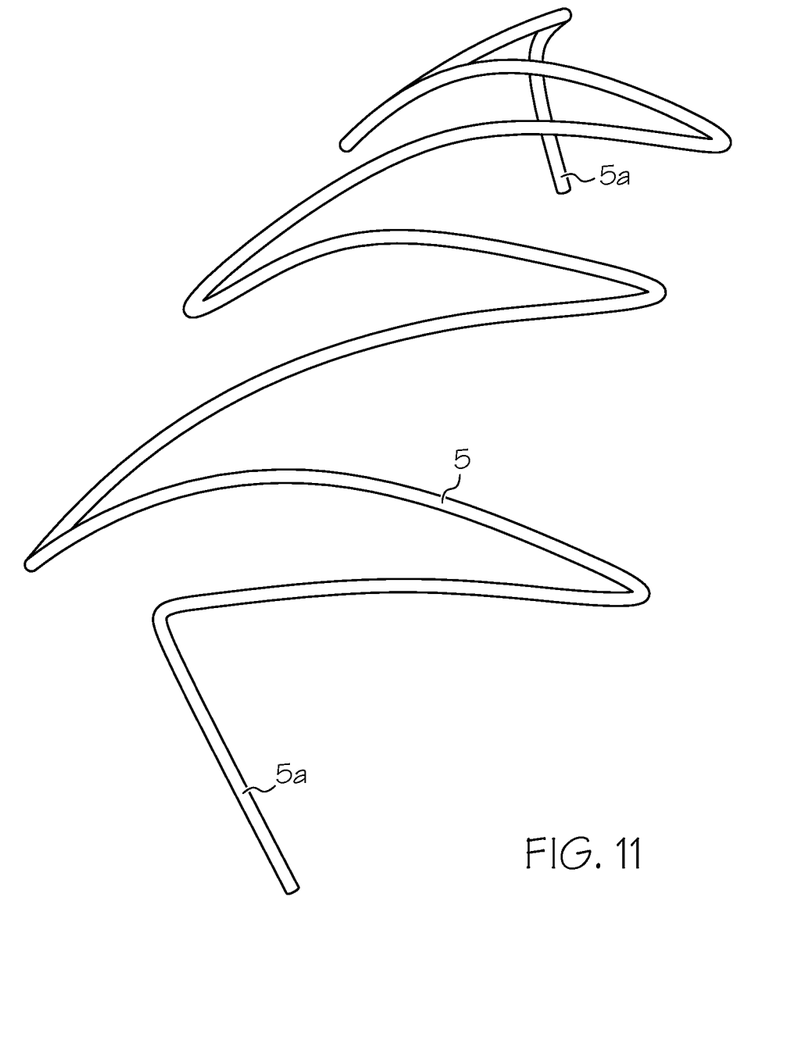
FIG. 11 shows a perspective view of a wire standoff having a zig-zag pattern and end portions having a straight segment for securing the wire standoff to a reactor component.

FIG. 11 shows a wire standoff having a middle portion with a zig zag pattern for being positioned between an outer tube and one or more reactor components. Each end portion 5a of the wire standoff 5 has a straight section or leg for extending inward towards the center of the reactor. The straight section of the end portions should have sufficient length to prevent the wire standoff from detaching from the reactor components during installation. The straight section of the end portions of the wire standoff can be in the range of 20 to 80 mm.

The wire standoff 5 can be positioned on the outer diameter face of the reactor components 2 by flexing or bending the standoff to align both end portions with a flow channel in the one or more fans. Once in position, the wire standoff can be released to provide a non-flexed state thereby creating tension at both end portions. The end portions 5a can press and provide a tension fitting at the flow channels for securing the wire standoff to the one or more reactor components. As noted above, the end portions 5a of the wire standoffs can be welded to the flow channels 2b, 2c of the reactor components 2 for securing them.

Figure 12:
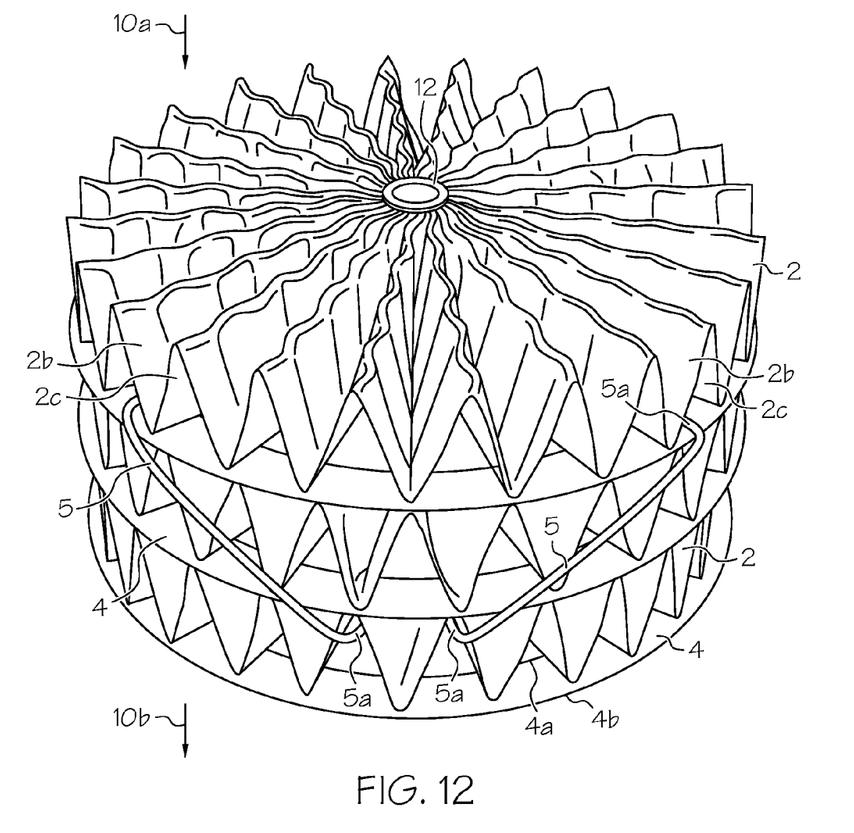
FIG. 12 shows a perspective view of a stack of reactor components having multiple wire standoffs arranged along the outer diameter face of the reactor components.
Figure 13:
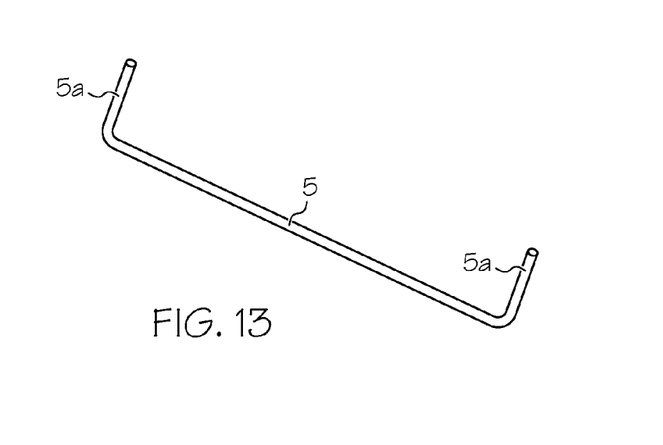
FIG. 13 shows a perspective view of a wire standoff having straight ends for securing the wire standoff to one or more reactor components.

FIGS. 12 and 13 show another embodiment of a wire standoff 5 that can be secured to reactor components 2. Each end portion 5a of a wire standoff can have a straight section that can extend into a reactor component 2. The straight section can extend into the reactor component in a direction that is substantially perpendicular to the outer circumferential face of the reactor component and the inner wall surface of the outer tube. In between the two end portions 5a of each wire standoff is a portion positioned between the outer tube and the outer face of the reactor components to prevent the components from coming into contact with the outer tube. As shown, the middle portion of the wire standoff for ensuring a gap between the outer tube and reactor components can be substantially straight and traverse diagonally along the face of the components.

Diagonal positioning of the middle section of the wire standoffs can be on an angle in the range of 5 to 70 degrees. Multiple wire standoffs can be arranged around the outer diameter surface of the stacked fans to provide 360 degree coverage of the stacked components for ensuring a specified gap is maintained around the components and between the inner wall of the outer tube. Although three components are shown, the stack can include more components and the wire standoffs can have a length to accommodate any number of components.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modification as encompassed by the scope of the appended claims.

What is claimed is:

1. A reactor comprising:
   a) an outer tube;
   b) one or more reactor components, the one or more reactor components having an outer circumferential face, the one or more reactor components being positioned in the outer tube;
   c) a wire standoff, a portion of the wire standoff being positioned between the outer tube and the one or more reactor components to prevent the one or more reactor components from contacting the outer tube; and
   d) a washer being positioned in the outer tube,
   wherein (i) the wire standoff has an end portion; (iii) the wire standoff is secured to the washer by the end portion; and (iii) the end portion has a hook for securing the end portion to the washer.

2. The reactor of claim 1, the wire standoff having a diameter in the range of 0.25 to 10 mm.

3. The reactor of claim 1, the outer circumferential face of the one or more reactor components being spaced at least 0.25 to 10 mm from the outer tube.

4. The reactor of claim 1, the wire standoff being secured to at least one of the one or more reactor components.

5. The reactor of claim 4, wherein the end portion of the wire standoff has a straight segment, and the end portion extends inward into the at least one reactor component through its outer circumferential face.

6. The reactor of claim 1, the portion of the wire standoff positioned between the outer tube and the outer circumferential face of the one or more reactor components being in direct contact with the outer tube and the one or more reactor components.

7. The reactor of claim 1, the hook of the end portion of the wire standoff having a bend angle in the range of 70 to 180 degrees.

8. The reactor of claim 1, the washer having an opening for securing the wire standoff.

9. The reactor of claim 8, wherein the end portion extends through the opening in the washer for securing the wire standoff to the washer.

10. The reactor of claim 1, wherein the hook forms an open slot, the washer being positioned in the open slot of the hook for securing the wire standoff to the washer.

11. The reactor of claim 1, further comprising a second washer positioned in the outer tube, the wire standoff having a second end portion, the second end portion of the wire standoff being secured to the second washer.

12. The reactor of claim 11, the second end portion of the wire standoff having a hook for securing the second end portion to the second washer, wherein the hook of the first end portion and the hook of the second end portion has a bend angle in the range of 70 to 180 degrees.

* * * * *